United States Patent
Grunewald et al.

(10) Patent No.: US 6,192,439 B1
(45) Date of Patent: Feb. 20, 2001

(54) PCI-COMPLIANT INTERRUPT STEERING ARCHITECTURE

(75) Inventors: Paul Grunewald, Morgan Hill; Wesley H. Stelter, San Bruno; Jiangang Ding, San Jose, all of CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/132,620

(22) Filed: Aug. 11, 1998

(51) Int. Cl.⁷ .................................................. G06F 13/24
(52) U.S. Cl. ............................................. 710/260; 710/48
(58) Field of Search .................... 710/260–269

(56) References Cited

U.S. PATENT DOCUMENTS

| | | | |
|---|---|---|---|
| 3,812,463 | * 5/1974 | Lahti et al. | 710/269 |
| 4,604,500 | * 8/1986 | Brown et al. | 379/269 |
| 4,769,768 | * 9/1988 | Bomba et al. | 710/268 |
| 5,381,541 | * 1/1995 | Begun et al. | 710/269 |
| 5,428,799 | * 6/1995 | Woods et al. | 710/266 |
| 5,506,997 | 4/1996 | Maguire et al. | 395/800 |
| 5,560,019 | * 9/1996 | Narad | 710/260 |
| 5,619,703 | 4/1997 | Omid et al. | 395/734 |
| 5,640,571 | * 6/1997 | Hedges et al. | 710/261 |
| 5,708,813 | * 1/1998 | Cho et al. | 710/260 |
| 5,721,931 | 2/1998 | Gephardt et al. | 395/733 |
| 5,913,045 | * 6/1999 | Gillespie et al. | 710/129 |
| 6,006,301 | * 12/1999 | Tetrick | 710/128 |

OTHER PUBLICATIONS

Mylex Corporation; Part No. 771971–D01; PCI RAID Controller Installation Guide, DAC960PG, PCI to Ultra–SCSI; copyright 1997 Mylex Corporation.

* cited by examiner

Primary Examiner—Sumati Lefkowitz

(57) ABSTRACT

An interrupt steering architecture that enables an intelligent peripheral device to process interrupts from PCI devices associated with a PCI bus is disclosed. The interrupt steering architecture enables the PCI interrupt signals to be steered to either a host CPU or to an intelligent peripheral device. The interrupt steering architecture is wholly compliant with the PCI bus specification and does not utilize additional sideband signals. The interrupt steering architecture is under user control and can be set by the user at system initialization or reset.

20 Claims, 9 Drawing Sheets

PCI-COMPLIANT INTERRUPT STEERING ARCHITECTURE

FIELD OF THE INVENTION

The present invention relates generally to computer systems. More particularly, the invention relates to an interrupt steering device for use in a PCI-compliant computer system.

BACKGROUND OF THE INVENTION

Interrupts are a commonly used mechanism that peripheral devices use to request the service of a central processing unit (CPU). For example, a parallel port connected to a printer can generate an interrupt to the CPU requesting that the CPU transmit additional characters to the printer. In this way, the CPU is able to perform other tasks until the printer requires service.

FIG. 1A illustrates an exemplary interrupt-driven computer system 100. There is shown a host CPU 102 and a bus bridge 104 connected to a host bus 106. The bus bridge 104 contains an interrupt routing mechanism 108 and an interrupt controller 110. The bus bridge 104 is connected to a Peripheral Component Interface (PCI) bus 112 and an Industry Standard Architecture (ISA) bus 114. One or more peripheral devices 116A–116N are connected to the PCI bus 112 (herein referred to as PCI devices) and one or more peripheral devices 118A–118M are connected to the ISA bus 114 (herein referred to as ISA devices).

The interrupt routing mechanism 108 receives the interrupts from the PCI devices 116 and routes them to an appropriate interrupt request (IRQ) signal. The interrupts from the ISA devices 118 are IRQ signals which are transmitted directly to the interrupt controller 110. The IRQ signals are received by the interrupt controller 110 which generates an appropriate interrupt to the host CPU 102.

Each PCI device 116 can be an add-in board or a component embedded on the board containing the PCI bus 112. Four interrupt pins are associated with each PCI device 116 and are herein referred to as pin A, pin B, pin C, and pin D. Pin A is typically associated with the INTA# interrupt signal, pin B is associated with the INTB# interrupt signal, pin C is associated with the INTC# interrupt signal and pin D is associated with the INTD# interrupt signal. Single-function PCI devices utilize pin A and multi-function PCI devices can utilize more than one interrupt pin. The interrupt pins associated with each PCI device 116 can be connected to the system board traces in a variety of ways. An example of one such way is shown in FIG. 1B.

There is shown three PCI devices, 116A, 116B, 116C, where the interrupt traces or signals are shared between the three PCI devices, 116A–116C. An interrupt signal is shared between the PCI devices 116 in order to compensate for the limitation of four interrupts. Interrupt trace or signal INTA# is tied to interrupt pin B of PCI device$_1$ 116A, interrupt pin C of PCI device$_2$ 116B, and interrupt pin A of PCI device$_3$ 116C. Interrupt signal INTB# is tied to interrupt pin C of PCI device$_1$ 116A, interrupt pin A of PCI device$_2$ 116B, and interrupt pin B of PCI device$_3$ 116C. Likewise, interrupt signal INTC# is tied to interrupt pin A of PCI device$_1$ 116A, interrupt pin B of PCI device$_2$ 116B, and interrupt pin C of PCI device$_3$ 116C. All of the D pins are tied to the INTD# signal.

Each of the interrupt signals, INTA#–INTD#, is hardwired to a separate input of the interrupt routing mechanism 108. The interrupt routing mechanism 108 is used to assign each interrupt signal, INTA#–INTD#, to a specific interrupt request signal, $IRQ_1$–$IRQ_L$. The interrupt controller 110 receives the interrupt request signals, $IRQ_1$–$IRQ_L$, and in response asserts a corresponding interrupt request to the host CPU 102.

A recent trend in the computing industry has been to use intelligent peripheral devices to control portions of the I/O activity ongoing in a computer system. In this way, the CPU is relieved of controlling these tasks and can be utilized to perform other tasks. An example of such an intelligent device is a redundant array of inexpensive disks (RAID) controller which is shown in FIG. 2.

There is shown an exemplary computer system 130 utilizing a RAID controller 132 to control the transfer of data to and from external storage devices 134A–134B. The RAID controller 132 is connected to a PCI bus 112. Additional PCI devices 116A–116N can be connected to the PCI bus 112 as well. In addition, a bus bridge 104 connects the PCI bus 206 to a host bus 212, to which is coupled to a host CPU 102. The bus bridge 104 includes an interrupt routing mechanism 108 that receives interrupts from each of the PCI devices and the RAID controller 132 and which generates a corresponding IRQ signal that is transmitted to an interrupt controller 110. The interrupt controller 110, in turn, generates a corresponding interrupt to the host CPU 102.

The RAID controller 132 includes a processor module 138 that is in communication with the PCI bus 112 and an internal bus 136. One or more small computer system interface (SCSI) controllers 140A–140N or the like can be connected to the internal bus 136. The processor module 138 can include a processor, an interrupt router, and an interrupt controller (all not shown) that receive and service the interrupts generated from the devices connected to the internal bus 136.

A drawback with this computer system 130 is that the host CPU 102 receives the interrupts from each of the peripheral devices 132, 116 connected to the PCI bus 112. This unnecessarily burdens the host CPU 102 thereby degrading the overall performance of the computer system 130. In order to improve the performance of the computer system 130, it would be beneficial for the RAID controller 132, or other intelligent peripheral device, to control the interrupts generated from the other PCI devices 116 rather than the host CPU 102. In this way, the CPU 102 is not burdened with servicing these interrupts and is able to proceed with processing other tasks.

SUMMARY OF THE INVENTION

The present invention pertains to an interrupt steering mechanism that enables interrupt signals to be steered to intelligent devices other than a host CPU. In particular, the interrupt steering mechanism can be used to steer interrupt signals generated from peripheral devices to an Intelligent I/O (I2O) device which processes the interrupt signals, thereby relieving the host CPU from processing these interrupt signals.

The interrupt steering mechanism includes an interrupt steering device and an interrupt assist device. An interrupt steering mechanism is associated with each device that receives the interrupts and controls which interrupts are received by the device. In particular, the I2O controller is associated with a first interrupt steering mechanism and the host CPU is in communication with a second interrupt steering mechanism. The first interrupt steering mechanism is used to steer interrupts to the I2O controller and the second interrupt steering mechanism is used to steer interrupts to the host CPU.

The interrupt assist device enables the interrupt steering devices to route the interrupt signals in the desired manner, which can be to the host CPU, to the intelligent peripheral device, or to any combination thereof. The interrupt assist devices can be a programmable mechanism that is set by the user through configuration software and the system BIOS.

The interrupt steering and assist devices enable the intelligent peripheral device to handle and process interrupts from other devices. In this way, the host CPU is relieved of processing these interrupts and is free to process other tasks thereby improving the overall performance of the computer system. Furthermore, the interrupt steering mechanism utilizes the signals from the PCI bus and does not require any sideband or additional signals apart from the PCI bus. In this way, the interrupt steering mechanism is compliant with the PCI bus protocol.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1A:
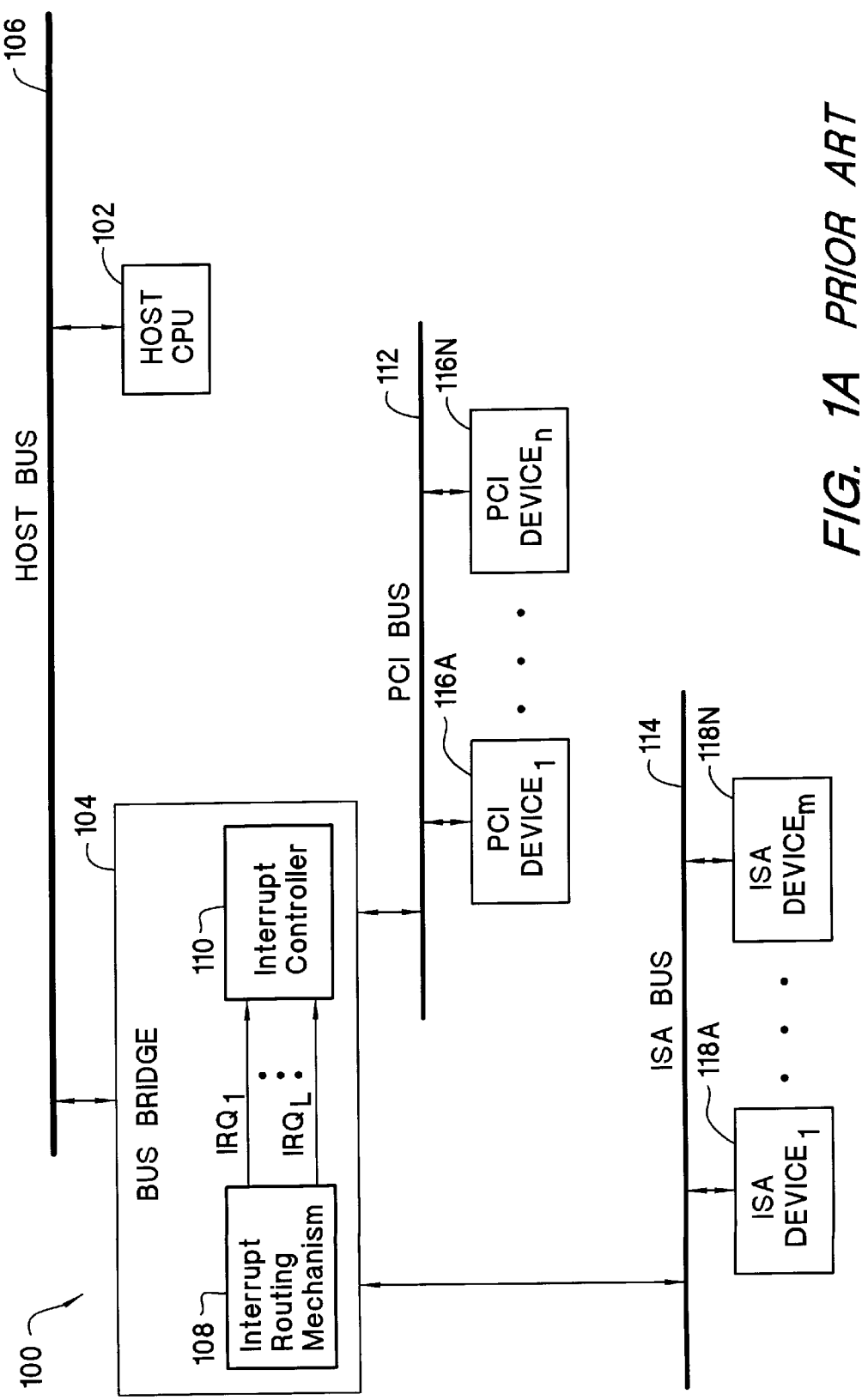
FIG. 1A illustrates a first exemplary prior art computer system.
Figure 1B:
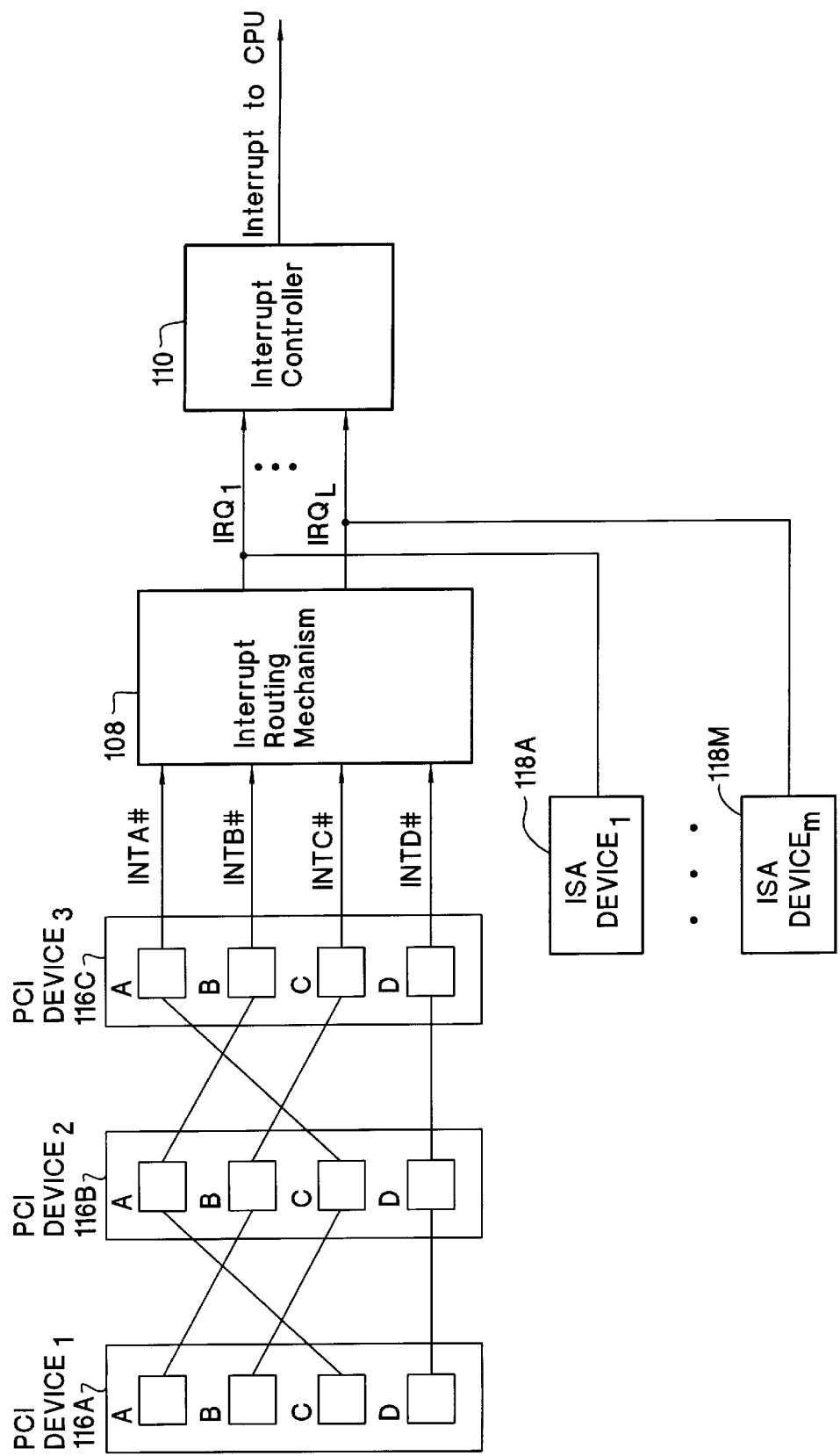
FIG. 1B illustrates the sharing of interrupt signals for the computer system shown in FIG. 1A.
Figure 2:
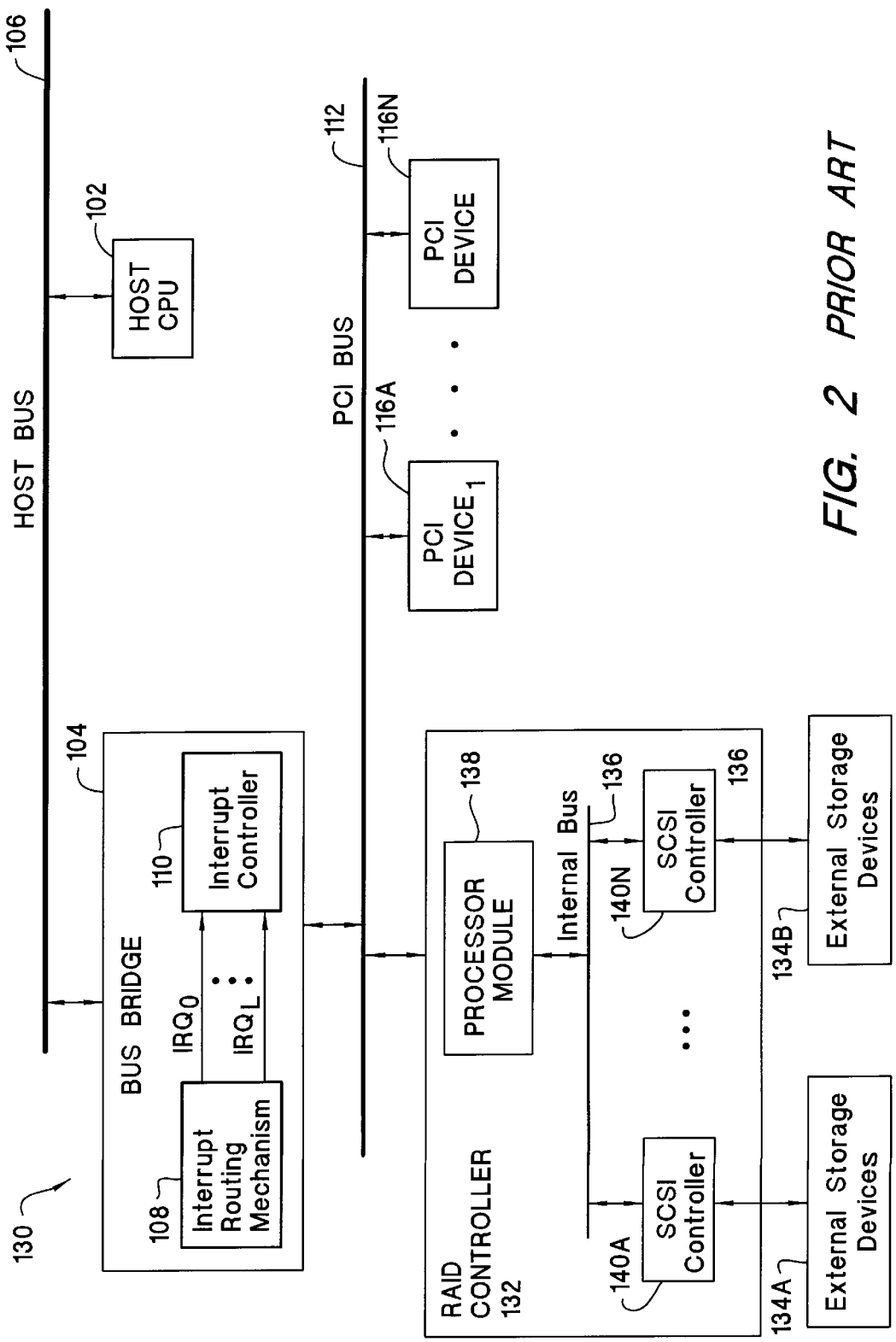
FIG. 2 illustrates a second exemplary prior art computer system.
Figure 3:
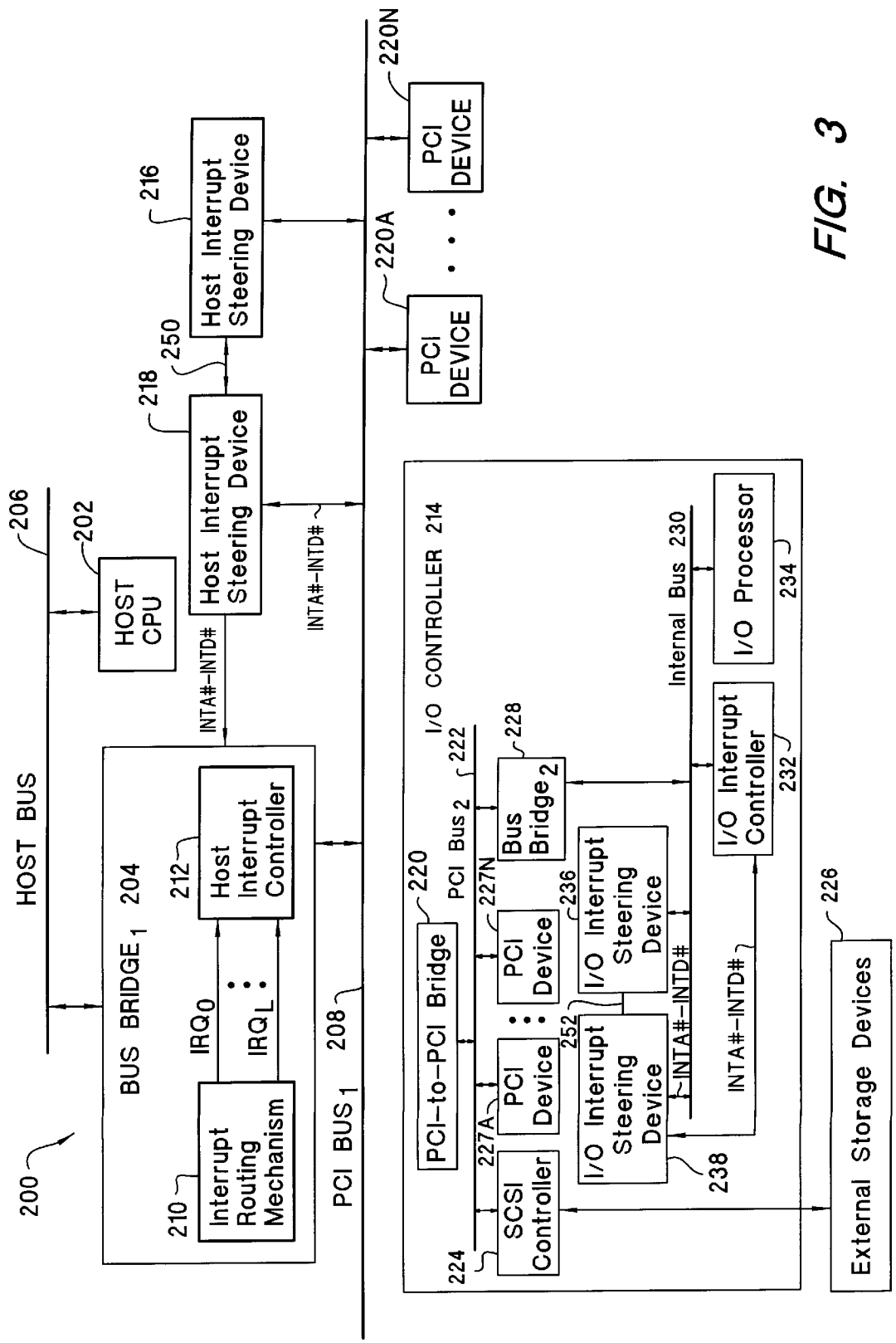
FIG. 3 illustrates a computer system utilizing the technology of the present invention in accordance with a preferred embodiment of the present invention.

FIG. 3 illustrates a computer system 200 employing the technology of the present invention. There is shown a computer system 200 including a host CPU 202 and a bus bridge 204 connected to a host bus 206. The bus bridge 204 is also connected to a first PCI bus 208 to which is coupled a number of PCI devices. The host CPU 202 can be any type of microprocessor or processor element, such as but not limited to any of the microprocessors in the Intel X86 family of microprocessors, and the like. The bus bridge 204 can be any commercially available bus bridge, such as but not limited to, the Intel 82371, and the like.

The bus bridge 204 includes an interrupt routing mechanism 210 and a host interrupt controller 212. The interrupt routing mechanism 210 receives interrupts from the devices connected to the first PCI bus 208 and routes them to a corresponding IRQ signal which is transmitted to the host interrupt controller 212. The host CPU 202 receives interrupt requests from the host interrupt controller 212. The host interrupt controller 212 can be any type of interrupt controller such as but not limited to the Intel 8259 controller and the like.

The first PCI bus 208 is coupled to an I/O controller 214, a host interrupt assist device 216, a host interrupt steering device 218, and a number of other PCI devices 220A–220N. Typically, the PCI devices 214, 216, 218, 220 are add-in boards that reside in a PCI slot or are embedded components that are tied to the PCI bus 208. The I/O controller 214 and the host interrupt assist device 216 are PCI devices. Other examples of PCI devices include, but are not limited to, network interface controllers, SCSI controllers, RAID controllers, video adapters, bus bridges, and the like.

The operation of the PCI bus is well known in the art. Interrupt signals INTA#, INTB#, INTC#, and INTD# are part of the PCI bus. A more detailed description of the PCI bus can be found in Solari and Willse, *PCI Hardware and Software Architecture and Design,* 4th edition, Annabooks (1998), in Mindshare, *PCI System Architecture,* 3rd edition, Addison Wesley (1996), and in *PCI Specification* rev. 2.1 from the PCI Special Interest Group, each of which are hereby incorporated by reference as background information.

The host interrupt steering device 218 controls which of the PCI interrupts are transmitted to the host interrupt controller 212 and hence, the host CPU 202. The host interrupt assist device 216 enables the host interrupt steering device to receive the interrupts. The function of these devices will be described in more detail below.

The I/O controller 214 is any type of intelligent processing device that has the ability to control the exchange of data between an external CPU or processor and peripheral or storage devices. In a preferred embodiment, the I/O controller 214 is an Intelligent I/O (I2O) controller supporting the I2O specification. A more detailed description of the I2O specification can be found in *Intelligent I/O (I2O) Architecture Specification,* version 2.0, March 1999, from the I2O Special Interest Group.

The I/O controller 214 can include a PCI-to-PCI bridge 221 (e.g., DEC 21152) that connects the first PCI bus 208 to a second PCI bus 222 that is internal to the I/O controller 214. One or more PCI devices are connected to the second PCI bus 222. For example, there can be a SCSI controller 224 that is in communication with external storage devices 226, one or more PCI devices 227, and a second bus bridge 228.

The second bus bridge 228 connects the second PCI bus 222 to an internal bus 230. An I/O interrupt controller 232, I/O processor 234, I/O interrupt assist device 236, and I/O interrupt steering device 238 are all connected to the internal bus 230. The I/O processor 234 controls the activity of the I/O controller 214 and can be any type of microprocessor or processor element, such as but not limited to, the Intel RD960 processor, and the like. The I/O interrupt controller generates interrupt request signals to the I/O processor 234. The I/O interrupt steering device 238 enables the I/O controller 232 to receive interrupts from the PCI devices 220, 216, 218 connected to the first PCI bus 208. The I/O interrupt assist device 236 enables the I/O interrupt steering device 238 to receive the interrupts.

Figure 4A:
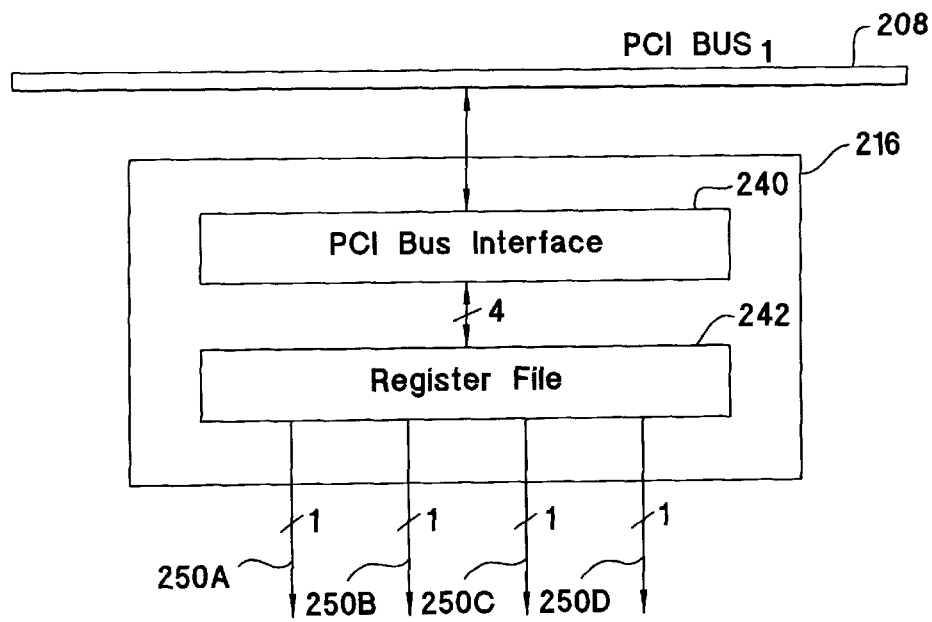
FIGS. 4A–4B illustrates the interrupt assist device shown in FIG. 3 in accordance with a preferred embodiment of the present invention.
Figure 4B:
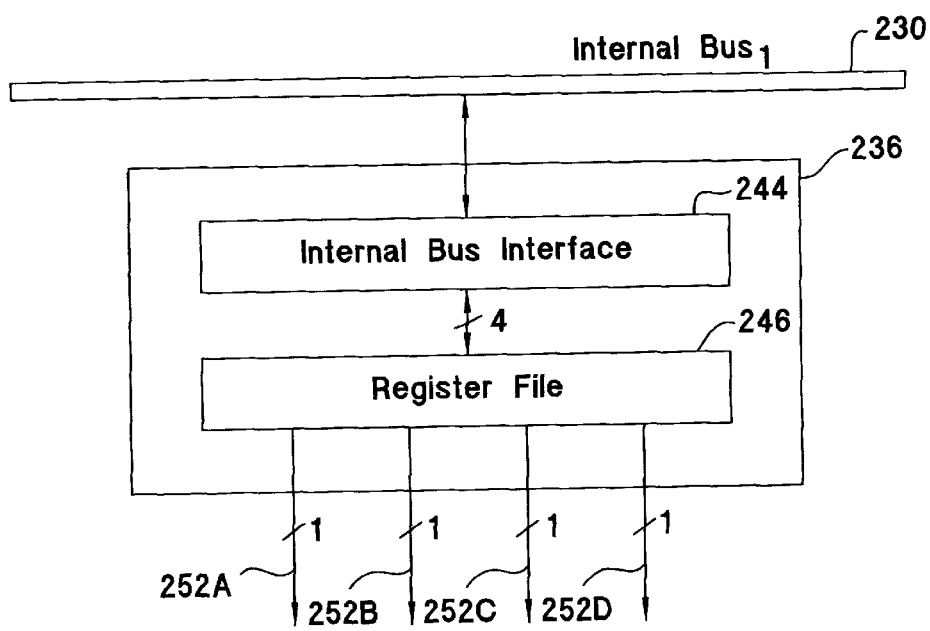

FIGS. 4A and 4B illustrate the components of the interrupt assist device 216, 236. The interrupt assist device 216, 236 is used to enable the manner in which the interrupts are routed by the interrupt steering devices 218, 238. Each interrupt assist device 216, 236 has a respective bus interface that enables the interrupt assist device 216, 236 to communicate with the bus and a register file to store data received from the bus. FIG. 4A illustrates the components of the host interrupt assist device 216 and FIG. 4B illustrates the components of the I/O interrupt assist device 236.

Referring to FIG. 4A, there is shown a PCI bus interface 240 connected to a register file 242. The PCI bus interface 240 interacts with the PCI bus 208 in accordance with the PCI bus protocol to receive data which is then stored in the register file 242. The PCI bus interface 240 includes the necessary electrical components to interact with the PCI bus 208.

The register file 242 includes a number of registers which collectively store the values of assist signals 250 that are used by the host interrupt steering device 218 to control the interrupts that are received by the host interrupt controller 212. Preferably, the register file 242 includes a set of four one-bit registers. Each one-bit register is associated with a particular assist signal 250A–250D. For example, assist signal 250A is used to steer interrupt signal INTA#, assist signal 250B is used to steer interrupt signal INTB#, assist signal 250C is used to steer interrupt signal INTC#, and assist signal 250D is used to steer interrupt signal INTD#. The register file 242 can be either a memory-mapped or an I/O-mapped device whose contents can be programmed by the host CPU 202.

FIG. 4B illustrates the components of the I/O interrupt assist device 236 that is coupled to the internal bus 230. There is shown an internal bus interface 244 and a register file 246. The internal bus interface 244 interacts with the internal bus 230 in accordance with the internal bus's protocol to receive data that is stored in the register file 246. The internal bus interface 244 includes the necessary electrical components to interact with the internal bus 230.

The register file 236 includes a number of registers which collectively store the values of the assist signals 252 that are used by the I/O interrupt steering device 238 to control the interrupts that are received by the I/O interrupt controller 232. Preferably, the register file 236 includes a set of four one-bit registers. Each one-bit register is associated with a particular assist signal 252A–252D. For example, assist signal 252A is used to steer interrupt signal INTA#, assist signal 252B is used to steer interrupt signal INTB#, assist signal 252C is used to steer interrupt signal INTC#, and assist signal 252D is used to steer interrupt signal INTD#. The register file 236 can be either a memory-mapped or an I/O-mapped device whose contents can be programmed by the host CPU 202.

Figure 5A:
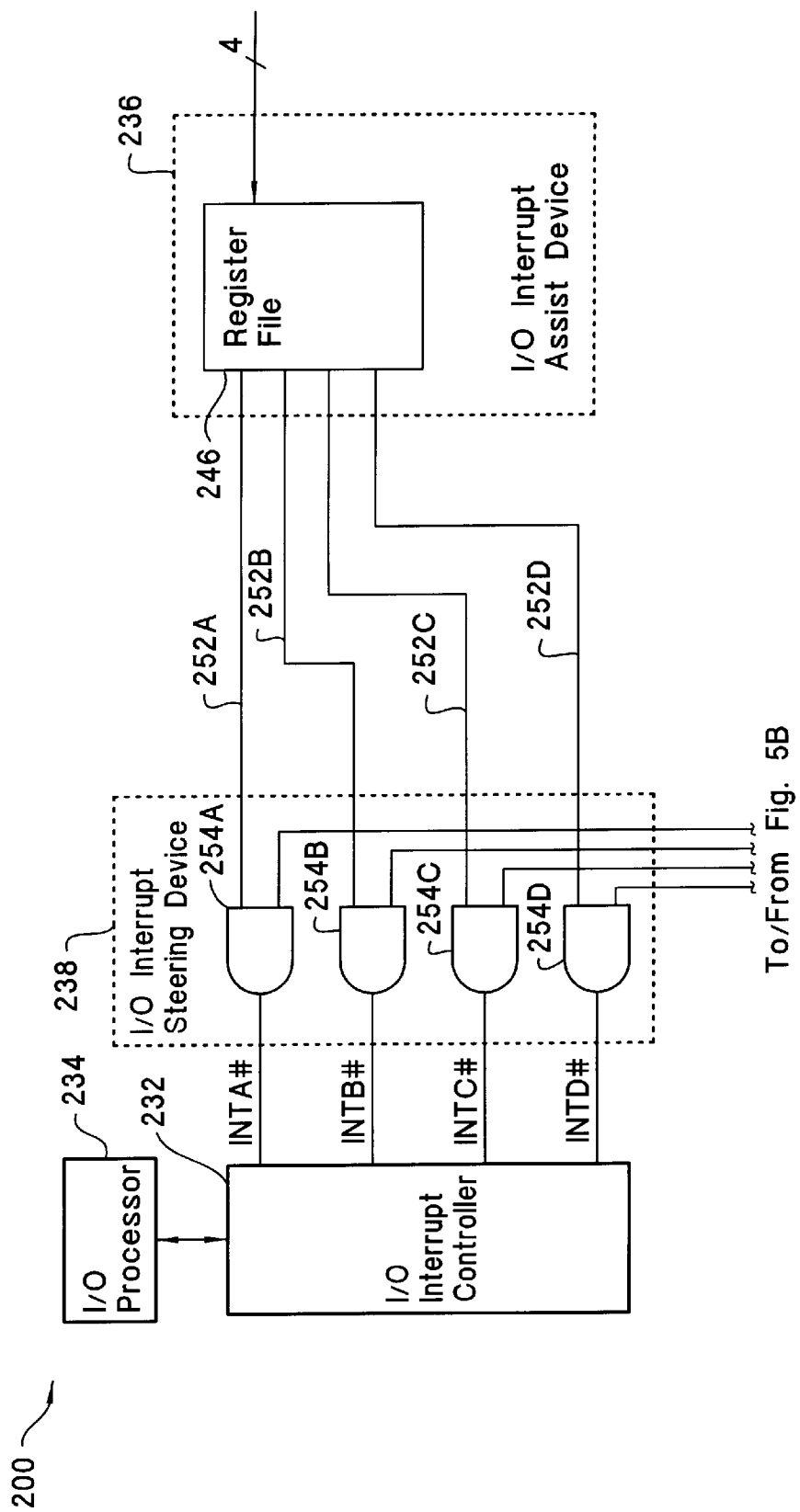
FIGS. 5A–5B is a block diagram illustrating the interrupt architecture of the computer system shown in FIG. 3 in accordance with a first preferred embodiment of the present invention.
Figure 5B:
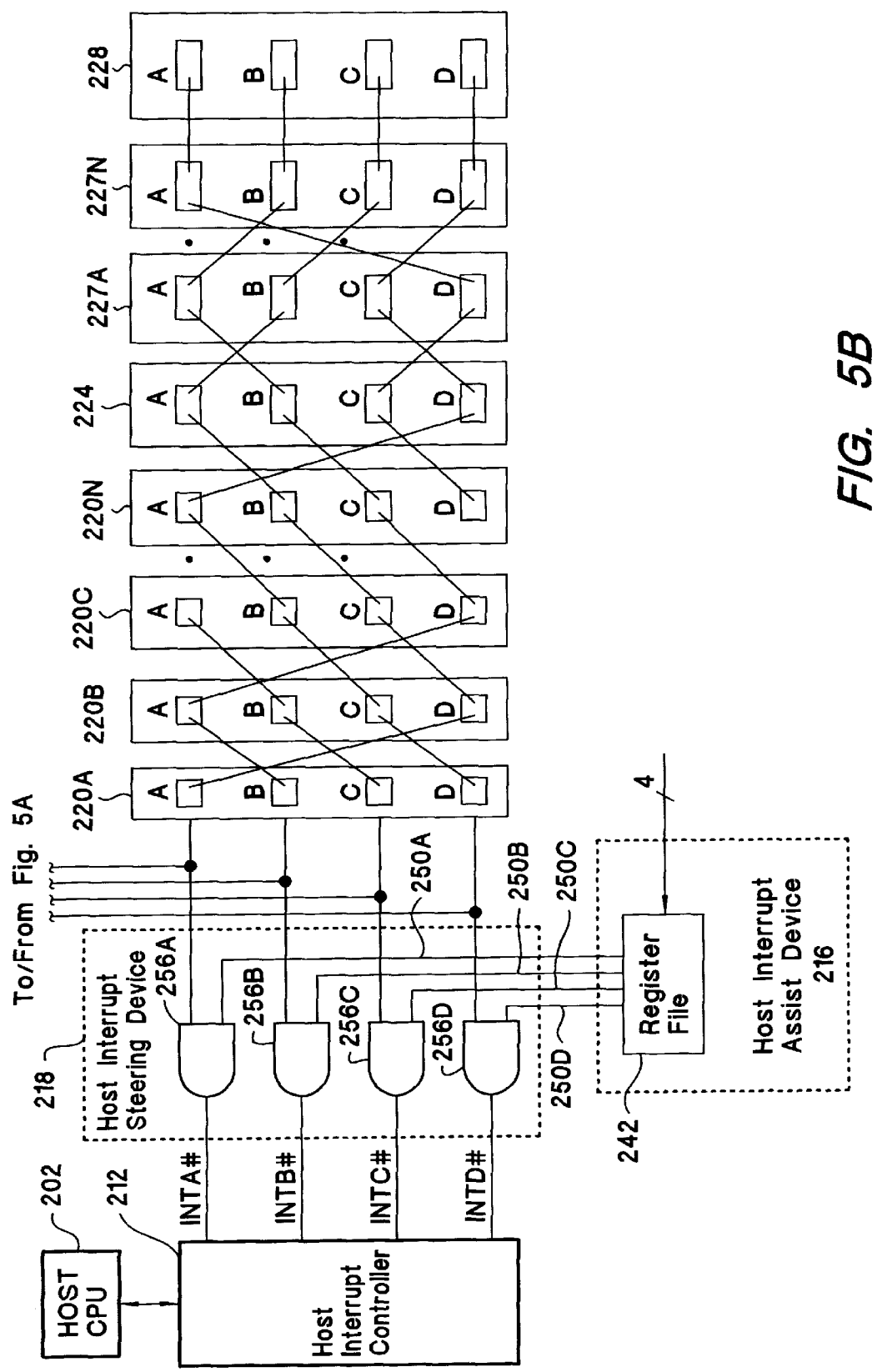

FIGS. 5A–5B are a more detailed diagrams illustrating the interrupt mechanism of the computer system 200. There is shown several PCI devices 220A–220N coupled to the first PCI bus 208 and several PCI devices 224, 227A–227N, 228 coupled to the second PCI bus 222. The interrupt pins associated with each PCI device are shared and tied to a respective interrupt signal. For example, interrupt signal INTA# can be tied to interrupt pin A of PCI device 220A, to interrupt pin D of PCI device 220B, to interrupt pin C of PCI device 220C, to interrupt pin B of PCI device 220N, to interrupt pin A of PCI device 224, to interrupt pin B of PCI device 227A, to interrupt pin C of PCI device 227N, and to interrupt pin C of PCI device 228.

Each interrupt signal, INTA#, INTB#, INTC#, and INTD#, is routed to the host interrupt steering device 218 and to the I/O interrupt steering device 238. Preferably, the interrupt steering devices 218, 238 include a set of AND logic gates 254, 256. Each AND logic gate is associated with a particular interrupt signal and its corresponding assist signal. The assist signal is set utilizing the interrupt assist device 216, 246. Based on the values of the interrupt signal and the assist signal, a particular interrupt signal is either routed to the host interrupt controller 212 or to the I/O interrupt controller 232.

For example, in order for the I/O processor 234 to receive an asserted INTA# signal, the INTA# signal is routed both to the AND gate 254A associated with the I/O interrupt steering device 238 and to the AND gate 256A associated with the host interrupt steering device 218. If the assist signal 252A associated with AND gate 254A is asserted, then the INTA# signal is routed to the I/O interrupt controller 232. If the assist signal 250A associated with AND gate 256A is asserted, then the INTA# signal is routed to the host interrupt controller 212.

Preferably, the assist signals are set such that when the assist signal associated with a particular interrupt signal in the I/O interrupt steering device 238 is asserted, then the assist signal corresponding to the same interrupt signal in the host interrupt steering device 218 is de-asserted. For instance, when the assist signal 252A associated with the host interrupt steering device 218 corresponding to the INTA# signal is asserted, the assist signal 250A associated with the I/O interrupt steering device 238 corresponding to the INTA# signal is de-asserted.

Likewise, in order to route the other interrupt signals, INTB#, INTC#, INTD#, to the I/O processor 234, the respective assist signal associated with the interrupt signal in the I/O interrupt steering device 238 is asserted and the respective assist signal in the host interrupt steering device 218 is de-asserted. To route an interrupt signal to the host CPU 202, the respective assist signal associated with the interrupt signal in the host interrupt steering device 218 is asserted and the respective assist signal in the I/O interrupt steering device 238 is de-asserted.

The values of each assist signal 250, 252 are stored in the respective register file 242, 246. Each register file 242, 246 can be either a memory-mapped or I/O-mapped device whose contents can be programmed by the host CPU 202 and which is described in more detail below.

Figure 6:
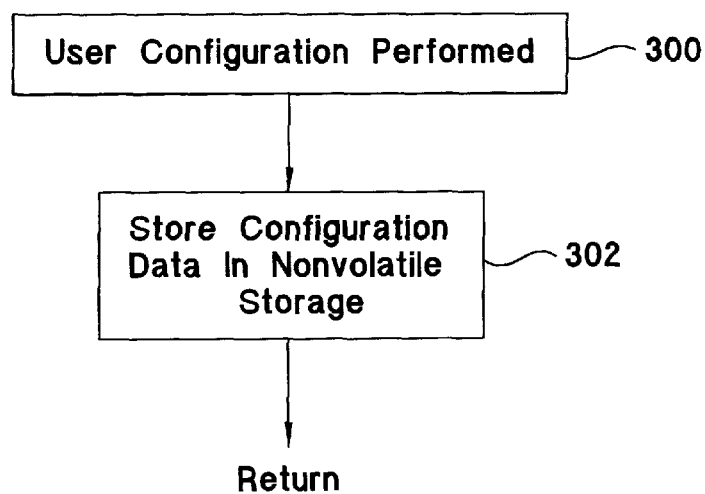
FIGS. 6–7 are flow charts illustrating the steps used to control an interrupt steering device in accordance with a preferred embodiment of the present invention.
Figure 7:
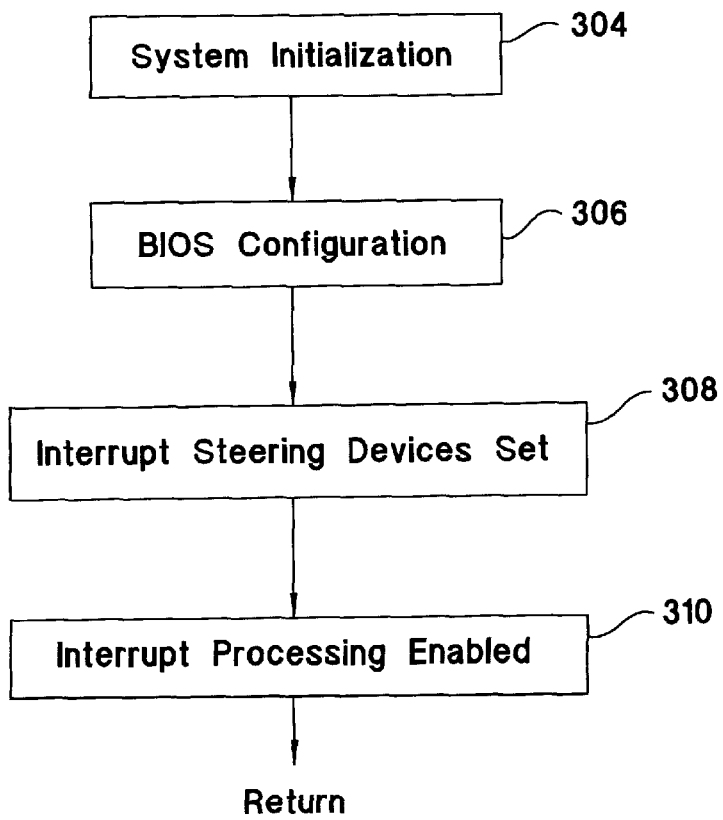

FIGS. 6 and 7 illustrate the steps used by the computer system 200 to initialize the interrupt steering devices 218, 238 so that the interrupts generated from the PCI devices can be routed to either the host CPU 202 or to an intelligent peripheral device such as an I/O controller 214. Referring to FIG. 6, initially a user configures the system in accordance with a user-defined criteria (step 300). Typically, the user configuration is performed once and is usually not repeated thereafter unless the system configuration changes. For example, the user configuration process allows the user to determine which PCI plug-in slots are to be used by the I2O controller, which PCI devices are controlled by the I2O controller, to define the bit settings for the interrupt assist devices 216, 236, and the like. The user configuration data is then stored in a non-volatile storage device, such as a non-volatile memory, for later use by the system BIOS (step 302).

Referring to FIG. 7, when the computer system 200 is powered-on or reset, a system initialization procedure is performed (step 304). The system initialization procedure includes a Power On Self Test (POST) and a system BIOS procedure. The POST procedure tests and initializes the individual components that are crucial to the operation of the computer system. A more detailed description of the POST and system BIOS procedure can be found in the incorporated references cited above.

The system BIOS procedure configures the components of the computer system 200 as well as perform other tasks (step 306). For example, the system BIOS procedure determines the range of PCI buses present in the computer system, scans for the PCI devices connected to each PCI bus, assigns the interrupt pins to a particular interrupt signal, and sets the configuration register space in each PCI device.

The system BIOS procedure obtains the bit settings for the assist signals 250, 252 by reading the user configuration data stored in the non-volatile storage (step 308). The values of the assist signals 250, 252 are set in each interrupt steering device 306, 332 so that the interrupts from select PCI devices are routed to either the host CPU 202 or the I/O processor 234. Once these values are obtained from the non-volatile storage, the system BIOS procedure writes the bit pattern into each of the registers 242, 246 which effectively sets each of the assist signals 250, 252.

Upon completion of the system BIOS procedure, the operating system is loaded and the system becomes operational. Interrupt processing is enabled with the host CPU 202 and the I/O processor 234 processing those interrupts assigned to them (step 310).

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

Figure 8:
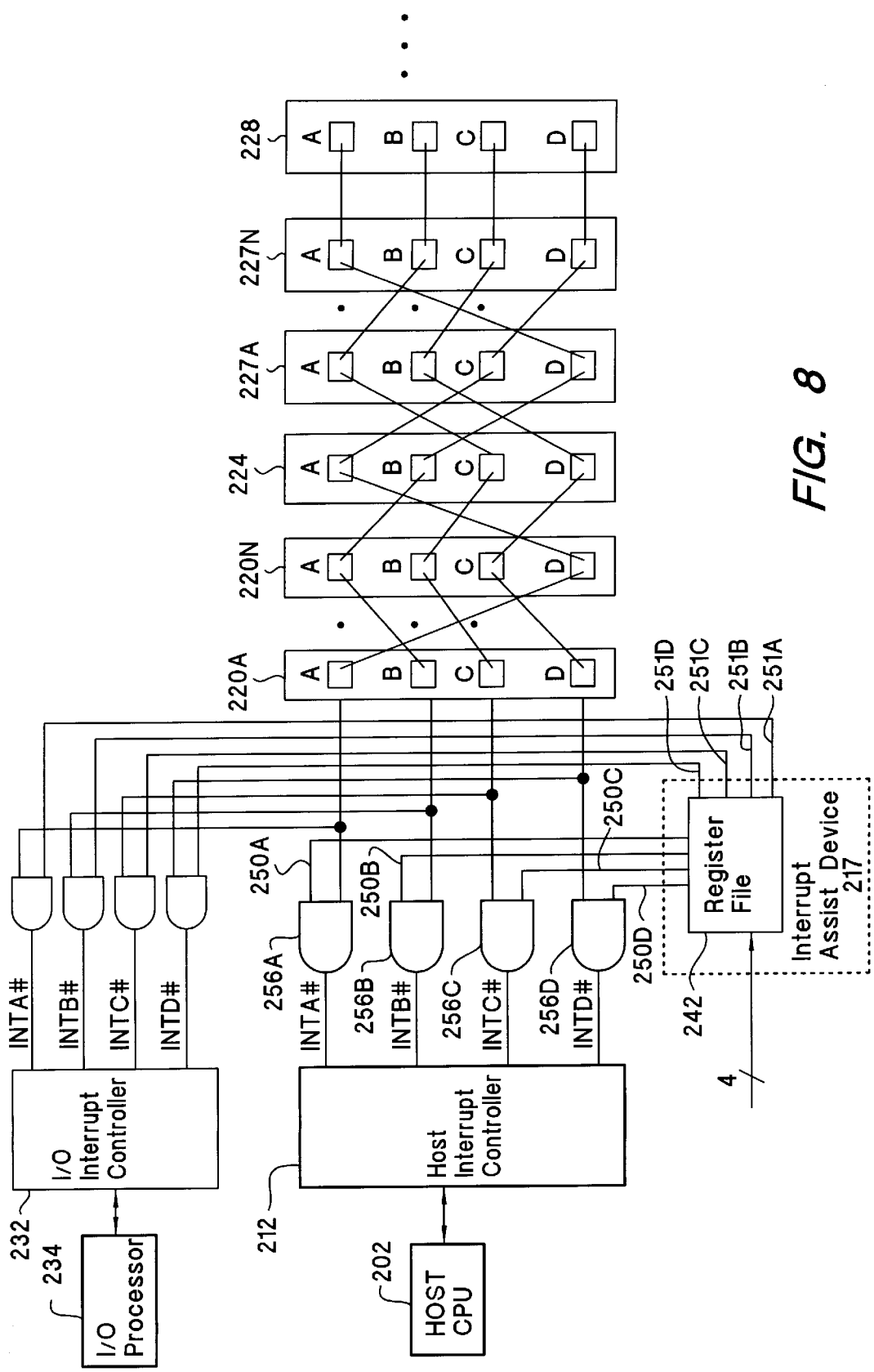
FIG. 8 is a block diagram illustrating the interrupt architecture in accordance with a second preferred embodiment of the present invention.

It should be noted that the present invention is not constrained to multiple interrupt assist devices and can be utilized with a single interrupt assist device 216 as shown in FIG. 8. There is shown a single interrupt assist device 217 generating a first set of assist signals 250 that are transmitted to the host interrupt steering device 218 and a second set of assist signals 251 which are the complement of the first set of assist signals 250. In this manner, the user needs to only assert those interrupt signals which are to be routed or steered to the host CPU 202 and the remaining interrupts are automatically routed to the I/O processor 234. The interrupt assist device can be located in the I2O controller or on the first PCI bus 208.

The present invention has been described with respect to the use of AND gates for the interrupt steering device. However, the present invention is not limited to this particular implementation. Other logic elements can be used such as but not limited to programmable logic arrays, field programmable logic arrays, and the like can be used.

In addition, the present invention has been described with reference to a host CPU and an I2O controller as the target of the steered interrupts. It should be noted that one skilled in the art can adapt this description to accommodate more than two devices that receive the steered interrupts, to accommodate other types of devices that receive the steered interrupts, and to accommodate devices on several peripheral buses and various types of peripheral buses.

Furthermore, the present invention is not constrained to the placement of the interrupt assist devices being on the buses shown in FIGS. 4A and 4B. The interrupt assist devices can be positioned on any type of communication link (e.g., bus, channel, etc.) such as but not including the PCI bus, the ISA bus, the EISA bus, and the like.

What is claimed is:

1. A computer system, comprising:
   a plurality of interrupt signals;
   a first and a second CPU in communication with the interrupt signals;
   a first interrupt steering device operatively coupled to the interrupt signals and to the first CPU, the first interrupt steering device having a capability to steer a first one of the interrupt signals to the first CPU; and
   a second interrupt steering device operatively coupled to the interrupt signals and to the second CPU, the second interrupt steering device having a capability to steer a second one of the interrupt signals to the second CPU while the first interrupt steering device steers the first one of the interrupt signals to the first CPU.

2. The computer system of claim 1, comprising:
   a first interrupt controller coupled to the first CPU and the first interrupt steering device, the first interrupt controller coupled to the interrupt signals and generating at least one interrupt request that is transmitted to the first CPU.

3. The computer system of claim 1, comprising:
   a second interrupt controller coupled to the second CPU and the second interrupt steering device, the second interrupt controller coupled to the interrupt signals and generating at least one interrupt request that is transmitted to the second CPU.

4. The computer system of claim 1, comprising:
   a first interrupt assist device coupled to the first interrupt steering device, the first interrupt assist device enables the first interrupt steering device to steer the first one of the interrupt signals to the first CPU.

5. The computer system of claim 4,
   wherein the first interrupt assist device enables the first interrupt steering device to steer the first one of the interrupt signals to the second CPU.

6. The computer system of claim 1, comprising:
   a second interrupt assist device is coupled to the second interrupt steering device, wherein the second interrupt assist device enables the second interrupt steering device to steer the second one of the interrupt signals to the first CPU.

7. The computer system of claim 6,
   wherein the second interrupt assist device enables the second interrupt steering device to steer the second one of the interrupt signals to the second CPU.

8. The computer system of claim 1,
   wherein the interrupt signals are part of a PCI bus and operate in accordance with a PCI bus protocol.

9. The computer system of claim 8,
   wherein the first interrupt steering device and the second interrupt steering utilize device comply with the PCI bus protocol.

10. The computer system of claim 1,
wherein the second CPU is associated with an intelligent peripheral device; and
wherein the second interrupt steering device is positioned in the intelligent peripheral device.

11. A method for operating a computer system, the computer system including a first CPU and a second CPU operatively coupled to a communication link including a plurality of interrupt signals, the method comprising the steps of:
providing a first and second interrupt steering mechanism operatively coupled to the communication link, the second interrupt steering mechanism distinct from the first interrupt steering mechanism;
enabling the second interrupt steering mechanism to steer a first select one of the interrupt signals to the second CPU; and
disabling the first interrupt steering mechanism from steering the first select one of the interrupt signals to the first CPU;
wherein the second interrupt steering mechanism has a capability to steer a second one of the interrupt signals to the second CPU while the first interrupt steering mechanism steers a first one of the interrupt signals to the first CPU.

12. The method of claim 11 further comprising the steps of:
enabling the first interrupt steering mechanism to steer a second select one of the interrupt signals to the first CPU; and
disabling the second interrupt steering mechanism from steering the second select one of the interrupts to the second CPU.

13. The method of claim 11, further comprising the steps of:
coupling a first interrupt assist device to the first interrupt steering mechanism; and
configuring the first interrupt assist device to enable the first interrupt steering mechanism to steer the first select one of the interrupt signals to the second CPU.

14. The method of claim 13, further comprising the step of:
configuring the first interrupt assist device to enable the first interrupt steering mechanism to steer the first select one of the interrupt signals to the first CPU.

15. The method of claim 11, further comprising the steps of:
coupling a second interrupt assist device to the second interrupt steering mechanism; and
configuring the second interrupt assist device to enable the second interrupt steering mechanism to steer the first select one of the interrupt signals to the second CPU.

16. The method of claim 15, further comprising the step of:
configuring the second interrupt assist device to enable the second interrupt steering mechanism to steer the first select one of the interrupt signals to the first CPU.

17. A computer system, comprising:
a first and second processing devices responsive to interrupts;
a first and second interrupt controllers, the first interrupt controller generates interrupts to the first processing device, the second interrupt controller generates interrupts to the second processing device;
a communication link including a plurality of interrupt signals;
a first interrupt steering device operatively coupled to the communication link and to the first interrupt controller, the first interrupt steering device receiving the interrupt signals from the communication link and transmitting select ones of the interrupt signals to the first interrupt controller;
a first interrupt assist device coupled to the first interrupt steering device, the first interrupt assist device indicating to the first interrupt steering device the select ones of the interrupt signals;
a second interrupt steering device operatively coupled to the communication link and the second interrupt controller, the second interrupt steering device distinct from the first interrupt steering device, the second interrupt steering device receiving the interrupt signals from the communication link and transmitting designated ones of the interrupt signals to the second interrupt controller; and
a second interrupt assist device, the second interrupt assist device indicating to the second interrupt steering device the designated ones of the interrupt signals;
wherein the second interrupt steering device has a capability to steer a second one of the interrupt signals to the second processing device while the first interrupt steering device steers a first one of the interrupt signals to the first processing device.

18. The apparatus of claim 17,
wherein the second processing device is an I2O controller.

19. The apparatus of claim 17,
wherein the interrupt signals are part of a PCI bus and operate in accordance with a PCI bus protocol.

20. The apparatus of claim 19,
wherein the first interrupt steering device and the second interrupt steering devices comply with the PCI bus protocol.

* * * * *